United States Patent [19]

Powell et al.

[11] Patent Number: 5,214,078
[45] Date of Patent: May 25, 1993

[54] GAMMA RADIATION RESISTANT POLYCARBONATE COMPOSITION

[75] Inventors: Douglas G. Powell, Coraopolis; Charles E. Lundy, Pittsburgh, both of Pa.

[73] Assignee: Miles Inc., Pittsburgh, Pa.

[21] Appl. No.: 891,875

[22] Filed: Jun. 3, 1992

[51] Int. Cl.$^5$ .............. C08K 5/06; C08K 5/37; C08L 69/00
[52] U.S. Cl. .................. 523/136; 524/109; 524/110; 524/265; 524/308; 524/317; 524/332; 524/376; 524/377; 524/378; 525/409; 525/462
[58] Field of Search .............. 523/136; 524/109, 110, 524/265, 332, 308, 317, 376, 377, 378; 525/409, 462

[56] References Cited

U.S. PATENT DOCUMENTS

| | | | |
|---|---|---|---|
| 3,175,992 | 3/1965 | Anderson | 523/136 |
| 3,542,726 | 11/1970 | Stewart | 524/605 |
| 3,909,490 | 9/1975 | Mark | 260/45.7 S |
| 4,067,846 | 1/1978 | Mark | 260/45.9 KA |
| 4,751,288 | 6/1988 | Rosenquist et al. | 528/370 |
| 4,804,692 | 2/1989 | Lundy et al. | 523/137 |
| 4,874,802 | 10/1989 | Lundy et al. | 524/94 |
| 4,880,855 | 11/1989 | Nelson et al. | 523/136 |
| 4,880,856 | 11/1989 | Avakian | 123/136 |
| 4,904,710 | 2/1990 | Nace | 523/137 |
| 4,939,185 | 7/1990 | Nelson et al. | 523/136 |

FOREIGN PATENT DOCUMENTS 303894 2/1989 European Pat. Off. .

*Primary Examiner*—David J. Buttner
*Attorney, Agent, or Firm*—Joseph C. Gil; Aron Preis

[57] ABSTRACT

A thermoplastic polycarbonate molding composition comprising a polycarbonate resin and a stabilizing agent is disclosed. Containing (i) a polyether polyol and (ii) an aromatic disulfide, the agent imparts to the composition improved resistance to gamma-radiation-induced color change. Articles molded from the composition of the invention are suitable for the preparation of gamma-radiation sterilizable medical equipment.

3 Claims, No Drawings

GAMMA RADIATION RESISTANT POLYCARBONATE COMPOSITION

FIELD OF THE INVENTION

The invention relates to a molding composition and more particularly to a thermoplastic polycarbonate composition and radiation resistant articles molded therefrom.

SUMMARY OF THE INVENTION

The invention relates to a thermoplastic polycarbonate molding composition comprising a polycarbonate resin and a stabilizing agent. Containing (i) a polyether polyol and (ii) an aromatic disulfide, the agent imparts to the composition improved resistance to gamma-radiation-induced color change. Articles molded from the composition of the invention are suitable for the preparation of gamma-radiation sterilizable medical equipment.

BACKGROUND OF THE INVENTION

Polycarbonate has been used extensively to mold medical devices such as blood filters, blood oxygenators and the like. Prior to use, these medical devices must be sterilized, preferably by exposure to ionization radiation, e.g. gamma radiation or electron beam radiation, for a prescribed period of time. While the physical and mechanical properties of polycarbonate are substantially unaffected by this radiation, the exposure results in an often undesirable change in the color, a general yellowing, of the resin.

It has been the object of several researchers in the field to identify the means to reduce this objectionable formation of color. The patent literature is noted to include U.S. Pat. Nos. 4,804,692; 4,874,802 and 4,904,710 which disclosed gamma radiation resistant polycarbonate compositions containing polyether polyols.

Also relevant is 11.08.88-JP198940 for the disclosure that a polycarbonate composition containing an ester having mercapto group of thio glycolic acid or mercapto-propionic acid and alcohol is capable of being sterilized by exposure to radiation. A radiation sterilizable composition used for medical devices containing a semi-crystalline polymer, a hindered phenolic stabilizer, phosphite and a thioester (or thioether) has been disclosed in EP 303,894. Enhancing the color stability to sterilization radiation of polymer compositions has been disclosed in U.S. Pat. No. 4,939,185. Accordingly, compounds having defined thioether groups, including dithiane, are said to stabilize aromatic polycarbonate upon exposure to sterilizing radiation. Compounds having sulfone functional groups and thiazole functional groups have been disclosed to enhance the color stability of polycarbonate compositions in U.S. Pat. No. 4,880,855 and 4,880,856 respectively.

U.S. Pat. Nos. 4,067,846 and 3,909,490 are noted to disclose flame retardant polycarbonate compositions containing metal salts of sulfonic acids of aromatic sulfides. A cyclic polycarbonate oligomer is disclosed in U.S. Pat. No. 4,751,283. The oligomer may be prepared from monomers containing aromatic disulfides.

DETAILED DESCRIPTION OF THE INVENTION

Aromatic polycarbonates within the scope of the present invention are homopolycarbonates and copolycarbonates and mixtures thereof. The suitable polycarbonate resins have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, New York, 1964, all incorporated herein by reference).

In the present context, dihydroxy compounds suitable for the preparation of the polycarbonates of the inventor conform to the structural formulae (1) or (2).

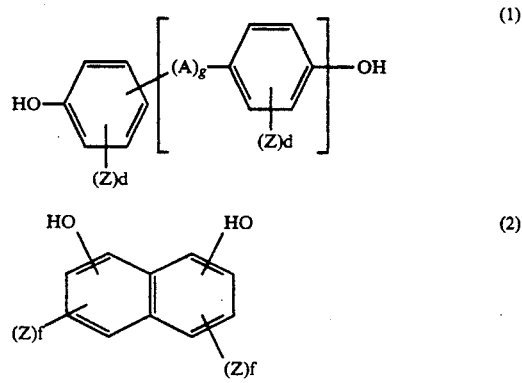

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

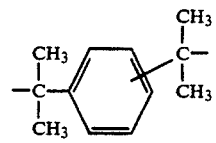

e and g both denote the number 0 to 1;
Z denotes F, Cl, Br or C$_1$-C$_4$-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,E21 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihyroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3 bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846: 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of Miles Inc. of Pittsburgh, Penna.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The stabilizing agent in accordance with the present invention comprise (i) a polyether polyol and (ii) an aromatic disulfide.

(i) The polyether polyol is a compound conforming to

$$YO\!+\!CHR\!+\!CH_2)_n\!-\!O\!+\!_m Y$$

where Y independently of one another is a hydrogen atom or a $C_{1-30}$ alkyl or acyl radicals, silyl or pyranyl radicals, and where R is a $C_{1-22}$-alkyl, cycloalkyl, aryl, alkylaryl or cycloalkyl-aryl radicals, n is an integer of 1 to 4 integer of 1 to 70; preferably Y is a hydrogen or a $C_{1-5}$ alkyl or a pyranyl radicals and R is a $C_{1-5}$ alkyl radical, n is 1 and m is about 20–50.

Compounds of this type are known and have been disclosed in the literature, see for instance U.S. Pat. Nos. 4,804,692, 4,874,802 and 4,904,710, the specifications of all of which are incorporated herein by reference.

(ii) the aromatic disulfide conforms to

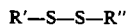

$$R'\!-\!S\!-\!S\!-\!R''$$

where R' and R'' independently are aryl radicals. Diphenyl sulfide which is available in commerce is an example of a suitable compound.

In the practice of the invention a composition suitable for the preparation of stable articles comprise polycarbonate resin and about 0.01 to 5.0 %, preferably 0.1 to 1.5% of (i) and about 0.01 to 5.0 %, preferably 0.1 to 1.5% of (ii), said percent being relative to the weight of the polycarbonate resin.

Conventional additives for components A) B) and C) may be incorporated in the mixtures according to the invention in the usual quantities before or during or after preparation of the mixtures.

The following are suitable additives: Fillers such as, for example, mineral fillers, plasticizers, fluidizing agents, and stabilizers against the deleterious effects of UV radiation, heat, moisture and the action of $O_2$, pigments and flame-retardants.

EXPERIMENTAL

Molding compositions in accordance with the present invention have been prepared and their properties evaluated. In the preparation of the compositions, the summary of which is presented below, the resin used was a homopolycarbonate based on bisphenol-A having a melt flow rate of about 15 gm/10 min. The additives noted below were incorporated in the polycarbonate composition in the indicated amounts. The polyether polyol conformed to

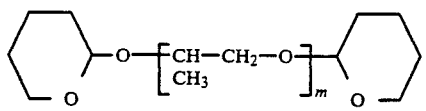

having a number average molecular weight of about 2000. The aromatic disulfide used in example 4 was diphenyl sulfide. In examples 5 and 6 there were used respectively, a benzophenone and an acetophenone.

The polycarbonate and additives were tumble blended together and then extruded on a ZSK-30 twin screw extruder at a melt temperature of about 270° C. The extruded strands were cooled, chopped into pellets and the pellets then molded at 282° C. into chips measuring 0.100 inch in thickness (about 0.25 cm.)

The chips were subjected to gamma radiation at doses of 3 and 5 Mrad. The yellowness index (YI) of the as molded and as irradiated chips were determined in accordance with ASTM D 1925. The measurements were taken approximately 24 hours after exposure to the radiation.

The table below show the effect of the radiation on the several compositions.

|  | 1 | 2 | 3 | 4 | 5 |
|---|---|---|---|---|---|
| additive, % polyether polyol | — | 1.0 | 0.5 | 0.5 | 0.5 |
| (di)phenyl disulfide | — | — | 0.5 | — | — |
| 2-hydroxy benzophenone | — | — | — | 0.5 | — |
| 2-hydroxy acetophenone | — | — | — | — | 0.5 |
| Melt Flow Index | 15.3 | 17.8 | 18.7 | 18.1 | 17.7 |
| Yellowness index* |  |  |  |  |  |
| Pre-radiation | 5.04/ | 2.92/ | 4.39/ | 3.76/ | 3.01/ |
| after 3 Mrad | 24.52/ | 14.1/ | 8.69/ | 15.02/ | 14.87/ |
| after 5 Mrad | 42.75 | 24.28 | 11.53 | 23.54 | 24.51 |

An additional set of compositions was prepared and the properties evaluated as summarized below. In the examples, the stabilizing effect of (di)phenyl disulfide was determined set in comparison to the effect of the stabilizing agent of the invention. The compositions were melt extruded and molded, at about 300° C., into bars measuring about 3 mm in thickness. The yellowness indices were determined before and after exposure to 3Mrad radiation; smaller Δ YI are indicative of better stability.

| Example | Initial YI | YI after 3 Mrad | Δ YI |
|---|---|---|---|
| A (0.05% DPS*) | 6.61 | 30.74 | 24.13 |
| B (0.1% DPS) | 6.7 | 29.2 | 22.5 |
| C (0.2% DPS) | 7.09 | 25.9 | 18.81 |
| D (0.05% DPS and 0.75% Polyether) | 5.9 | 18.35 | 12.45 |
| E (0.1% DPS and 0.75% Polyether) | 6.17 | 13.44 | 7.27 |
| F (0.2% DPS and 0.75% Polyether) | 8.1 | 12.6 | 4.5 |
| G (0.3% DPS and 0.75% Polyether) | 10.37 | 13.35 | 2.98 |

*DPS-(di)phenyl disulfide

In accordance with the findings, phenyl disulfide by itself is of little effect in stabilizing the composition. The agent of the invention, the combination of the disulfide and polyether polyol is demonstrably more effective in imparting color stability to the composition.

Although the invention has bee described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a polycarbonate resin and a stabilizing agent which includes (i) about 0.01 to 5.0% of a polyether polyol conforming to $$Y\text{-}O\text{-}(CHR\text{-}(CH_2)_n\text{-}O)_m\text{-}Y$$

where
Y independently of one another is a hydrogen atom or a $C_{1-30}$ alkyl or acyl radicals, silyl or pyranyl radicals, and where R is a $C_{1-22}$-alkyl, cycloalkyl, aryl, alkylaryl or cycloalkyl-aryl radicals, n is an integer of 1 to 4 and m is an integer of 1 to 70, and (ii) 0.01 to 5.0% of an aromatic disulfide conforming to $$R'\text{-}S\text{-}S\text{-}R''$$

where R' and R" independently are aryl radicals, said percents are relative to the weight of said resin.

2. The composition of claim 1 wherein said Y is a hydrogen or a $C_{1-5}$ alkyl or a pyranyl radicals and R is a $C_{1-5}$ alkyl radical and where n is 1 and m is about 30.

3. The composition of claim 2 wherein said (i) and said (ii) each are present in amounts of 0.1 to 1.5%.

* * * * *